UNITED STATES PATENT OFFICE 2,680,687

COFFEE PRODUCT AND PROCESS THEREFOR

Pierre Lemonnier, Paris, France

No Drawing. Application June 16, 1950,
Serial No. 168,655

14 Claims. (Cl. 99—71)

The present invention relates to an improved method for the preparation of a soluble coffee, more particularly to an improved method for obtaining an aromatic coffee fraction which can be used to impart to a soluble coffee product such as a powder or syrup and to various other foodstuffs a flavor and aroma characteristic of that of freshly brewed coffee.

It has long been desired to produce a soluble coffee powder from which cup coffee could be prepared that would be accepted as the equivalent of freshly brewed coffee. Although innumerable attempts have been made to accomplish this objective only mediocre results have thus far been achieved. This lack of success is for the most part due to the fact that most processes for producing a soluble coffee are incapable of providing a product with the aroma which is characteristic of freshly brewed coffee. A great variety of attempts have been made to eliminate this deficiency and among such are the collection of roaster and grinder gases at various low temperatures with the incorporation of the materials so obtained into the soluble coffee product. However, the materials so obtained are not satisfactory and fail to enhance the soluble coffee product for a variety of reasons.

The collection of roaster gases provides materials which are diluted by water to an extreme degree. This is readily understandable since any roasting process is also a drying process so that the roaster gases are preponderantly water vapor. Also, the flavor and odor of the material obtained bears no particular resemblance to coffee, but rather is highly acidulous and pyrogenous. This is to be expected since the characteristic coffee flavor and aroma are only developed in the final minutes of the roasting process and are deteriorated if the roasting is continued beyond the optimum time which is of the order of twelve minutes. Thus, there is only a very brief period when the roaster gases would even be desirable.

The collection of the gases that are liberated in the course of grinding the roasted coffee provides only a very small amount of the difficultly condensible or fugitive aromatic coffee principles. Moreover, the usefulness of such materials is practically negligible not only because of the small amount that is available but also because of the difficulty of condensing them and incorporating them into the soluble coffee. Also, such highly volatile materials only constitute a small fraction of the aromatic principles that make up the aroma of freshly brewed coffee so that their addition to soluble coffee does not amount to the addition of a properly balanced or proportioned coffee aroma.

It has also been proposed to subject ground roasted coffee to the action of heat in order to drive off and permit the collection of aromatic coffee principles. Such a process is commonly referred to as a "dry" distillation. As carried out by some of the prior art workers, however, such a distillation is essentially a steam distillation as evidenced by the fact that the coffee is moistened before and even during distillation. Also, the coffee is heated for extensive periods of time and at excessively high temperatures in order to obtain as much of the aromatic principles as may be obtained.

The methods of condensing and otherwise incorporating the aromatic principles into the coffee powder are likewise quite varied. Attempts have been made to absorb these principles in the coffee powder and by employing condensing temperatures of about —30° C. The more modern workers have resorted to temperatures as low as —180° C., i. e., those obtainable with liquid air or with liquid nitrogen. One worker shows the use of a series of condensers; the first maintained at ice temperatures, the second at about —30° C., the third at about —80° C. and the fourth and final condenser at about —180° C. Other modern workers have relied upon this same arrangement. Obviously, it would appear to have considerable advantage from a practical and economic standpoint since it provides for the most economical condensation of the water and carbon dioxide which constitute the great proportion of the materials that come over on dry distillation. This takes the burden off the final condenser and leaves it free for condensing only the most fugitive of the aromatic principles.

An object of the invention is to provide a coffee aroma fraction virtually identical with that associated with cup coffee which may be added to cup coffee, incorporated into a soluble coffee powder, a concentrated coffee infusion or syrup or into other foodstuffs. Another object is to provide soluble coffee products having a truly characteristic coffee aroma and flavor. Still another object is to provide a coffee aroma fraction in sufficiently concentrated form so that it may be incorporated directly into the soluble coffee powder without causing the same to become caked. A still further object is to provide a coffee aroma fraction without causing the deterioration of the coffee from which such fraction is obtained. Other objects will be apparent from the discussion that follows.

It has now been found that by subjecting roasted coffee to a dry distillation under relatively mild conditions a highly aromatic distillate of aromatic coffee principles is obtained. When added in relatively small amounts to cup coffee which has been prepared from an ordinary soluble coffee powder this distillate results in the beverage taking on a full-bodied coffee flavor and aroma. By virtue of using such conditions in carrying out the dry distillation, the most highly aromatic coffee principles are distilled over without undergoing any appreciable change so that they approximate to a close degree the aroma of freshly brewed coffee. Also, as a result of the mild conditions of heating employed, the roasted coffee which is so treated is not deteriorated to any appreciable degree so that it may be thereafter employed in the preparation of a soluble coffee powder or otherwise.

The aforementioned mild conditions employed for the distillation of the aromatic coffee principles involve the use of a temperature within the range of about 25°–80° C. under an absolute pressure of no more than 20 mm. for a relatively brief period of time. The period of time required depends for the most part upon the design of the equipment, the heating means employed and, in general, the efficiency in heat transfer that may be obtained in the given case. Ordinarily, the period of heating of about 30 minutes to two hours will suffice with optimum results being obtained in about one hour.

While the distillate may be condensed in any conventional manner, in order to secure the complete condensation thereof it is necessary to employ a condenser which is maintained at a temperature of about −180° C. In some cases where the moisture content of the ground roasted coffee subjected to dry distillation is relatively high, it is desirable to first pass the distilled vapors through a condenser maintained at about 0° C. or −30° C. In other cases, especially if the moisture content of the coffee which is being treated is below 2%, it is not necessary to employ condensing temperatures of 0° C. and −30° C. in order to obtain economic operation. In such a case it may be desirable to employ a condensing temperature of −80° C. in addition to the aforementioned condensing temperature of −180° C. which is always required for complete recovery of the distillate. Also, dry soluble coffee powder may be somewhat loosely packed in a condenser maintained at −80° C. or −180° C., at least when the moisture content of the roasted coffee being treated is 2% or less, to facilitate condensation of the aromatic coffee principles. It is preferred, however, to effect the condensation of the entire distillate at −180° C. since it has been found that this provides best results as far as the character and stability of the aromatic distillate is concerned.

Where the condensation is entirely effected at the lowest obtainable temperature, namely −180° C., the partial pressures of the fugitive aromatic coffee principles are minimized by the presence of the water and carbon dioxide so that the opportunity for such materials to escape is also minimized. Any losses which do occur because of an inability to effect perfect condensation are borne by the entire distillate and, therefore, while less than all of the aroma may be provided there is no upsetting of the balance between the less volatile and the more volatile aromatic principles provided by the dry distillation. Support for this is found in the fact that when using the stepwise condensation technique the sample provided at −180° C. when first obtained has only a faint odor of the fugitive coffee principles and that to retain this small amount the fraction must be recombined with the fractions condensed at the higher temperatures.

The differences in the character and quality of the condensates provided by the different methods of condensation may also be explained by saying that with fractional condensation of the aroma there is a separation of certain unstable aromatic principles from certain naturally present stabilizers which cannot occur when the condensation is effected in one step using −180° C. Support for this is found in the behavior of the material condensed at −80° C. using fractional condensation. On warming to room temperature, this material is found to be a light, straw-colored liquid possessing a strongly pungent odor. After standing at room temperature for 45 minutes, however, the material turns green in color and develops a strongly rancid odor. Storing the material at refrigerator temperatures instead of allowing it to warm up to room temperature does not change the result except that a somewhat longer period is required for the development of the green color and the rancidity.

As indicated hereinabove, the coffee which is subjected to dry distillation in accordance with the process of the present invention must be coffee which has been properly roasted. Green coffee is not appropriate because roasting is required to develop the characteristic coffee flavor and aroma. As far as is known, any variety of coffee may be employed so long as it has been properly roasted, as aforesaid. Depending on personal taste, the coffee may be subjected to any degree of roast and such degrees of roast may vary from a light roast to a very dark roast such as a French roast.

Although whole roasted beans may be subjected to dry distillation to yield the aromatic fraction with which the present invention is concerned, it is preferred to employ roasted coffee which has been ground. In cases where the coffee is to be used in the preparation of soluble coffee powder after it has been subjected to dry distillation, it is often desirable to employ coffee of a certain degree of sub-division, as in the case of percolative extraction where a relatively coarse grind of coffee is preferred. Aside from such considerations, however, it has been found preferable to have the coffee which is subjected to dry distillation in accordance with the present invention in as fine a degree of sub-division as is feasible. This greatly facilitates the distillation by shortening the time required therefor and/or increasing the amount of aromatic principles that are obtained by allowing them to diffuse out of the coffee more readily and also by increasing the rate of heat transfer.

Another factor that must be considered in connection with the roasted coffee which serves as the starting material in the present process is the moisture content thereof. It is possible to use the present process to provide a distillate of aromatic coffee principles in sufficiently concentrated form so that these principles may be added to a soluble coffee powder and effect a substantially complete re-aromatization without causing the powder to cake or without requiring further drying. It has been found that as the moisture content of the starting material is increased, the volume of the distillate is likewise increased. Moreover, it is increased to a much greater extent than would be expected. This effect is shown by the data of Table 1.

TABLE 1

*Dry distillation of 15 lbs. of ground roasted coffee at 70° C. for 1 hr. under 15 mm. pressure*

| Moisture Content of Coffee | Weight of Condensate (g.) [1] |
|---|---|
| 2.2 | 30.0 |
| 3.5 | 96.0 |
| 4.9 | 177.0 |
| 7.1 | 274.5 |

[1] After warming to about room temperature with consequent removal of carbon dioxide.

While the volume of the distillate is increased, there is no apparent increase in the amount of aromatic principles provided. In other words, the increase is essentially an increase in the water content of the distillate. Accordingly, it is preferred to employ coffee as a starting material which contains the lowest practicable moisture content.

The moisture content of the roasted coffee is largely determined by the means employed in cooling the same after roasting. In the course of roasting the temperature of the coffee very often reaches temperatures as high as 200°–235° C. and in order to have a properly controlled degree of roast and avoid over-roasting it is necessary to quickly cool the coffee. This cooling is usually accomplished in one of two ways, one of which involves the use of circulating air and the other the use of water. In cooling with air the beans are quickly removed from the roaster and spread out on screens through which cool air is blown. Using this method, is usually takes about 10 minutes to reduce the temperature of the beans to about room temperature. On the other hand, when the coffee is cooled with water, the beans are sprayed with water while still in the roaster just shortly after the roasting has been stopped. Thereafter, they are transferred to screens through which cool air is blown. In this manner the coffee is cooled to about room temperature in about 5 minutes. While the moisture content of the coffee which has been air-quenched is almost always below 2%, that of the coffee which has been water-quenched is usually in the range of 2.0–3.5% moisture.

Subjecting ground roasted coffee to a dry distillation at 50°–70° C. under a pressure of about 1 mm. or less for about one hour, a kilogram of coffee having a moisture content of 2% will yield about 4.5 grams of distillate which is rich in the desired aromatic coffee principles. This amount of distillate is the weight of the material after the carbon dioxide has been allowed to escape so that, of course, the weight of the total distillate is somewhat greater. While the distillate is for the most part water containing dissolved and/or suspended aromatic coffee principles, it is much richer in the relatively more fugitive constituents than any fraction available heretofore. From a kilogram of roasted coffee about 250 g. of soluble coffee powder may be obtained. While it may be provided in a substantially bone-dry condition, it usually contains about 2% moisture because of practical and economic considerations. It has been determined that the maximum moisture content of such powder cannot exceed about 4.5% without causing caking to occur on storage. It will be seen, therefore, that by the addition of the entire 4.5 grams of the aforementioned distillate to the 250 g. of soluble coffee powder, the moisture content of the powder is increased by only about 2%. Accordingly, it is preferred to employ coffee containing not more than 2% moisture as the starting material, especially when the aroma is to be combined with soluble coffee powder.

In some cases it may be desired to treat coffee containing more than 2% moisture in accordance with the invention even though a more dilute distillate is provided. In such a case, it is preferable to stop the distillation after the amount which can be entirely added to the coffee powder has been brought over. Of course, the entire quantity of the less concentrated distillate can be added to a concentrated coffee infusion or syrup which is used and sold as such or spray-dried to provide a coffee powder or the distillate can be added directly to a coffee powder with subsequent redrying of the powder to about 4.5% moisture. The more dilute distillate can also be used for imparting a coffee flavor to such foodstuffs as ice cream, cake icings, bottled beverages and the like.

While the aromatic coffee fraction with which the present invention is concerned may be employed to advantage in imparting a coffee flavor to various foodstuffs such as those aforementioned, a cereal beverage product prepared by roasting wheat, rye and other grains, or the corresponding soluble cereal beverage powder, on the other hand, when said aromatic fraction is added to a coffee powder, a concentrated coffee infusion, cup coffee or other coffee product, it is preferable that the variety or blend of varieties from which the aromatic fraction is obtained by dry distillation be the same as that from which the soluble powder, concentrated infusion, cup coffee or other coffee product has been derived.

As aforementioned, the dry distillation of the roasted coffee must be carried out under reduced pressure in order to insure the comparatively mild heating conditions which characterize the present invention. The maximum pressure that can be tolerated and still obtain the desired results is about 20 mm. The reduced pressure is provided in any conventional manner using a water aspirator, a steam ejector, an oil pump, and the like. As is well recognized the lower the pressure that obtains during distillation the lower the temperature required for the same. The lowest possible pressures are desirable in carrying out the process of the invention. However, such are not usually obtainable in commercial operations, the pressures in such cases being in the range of 1 to 5 mm.

While dry distillation of roasted coffee may be carried out over a wide range of temperatures, the distillation of the principles with which the present invention is concerned is restricted to the aforementioned relatively low temperatures. The temperature of distillation may be as low as 25° C. but this requires a much longer period of treatment and for this reason a temperature of about 40° C. or preferably one somewhat above 50° C. is employed. Also, the aroma obtained at 40° C. or 50° C. or somewhat above is of preferred character, probably because only the most fugitive principles are obtained at a temperature of about 25° C. and also because the condensation of such very fugitive materials in the absence of less fugitive and more easily condensible compounds is more difficult. On the other hand, when proceeding at temperatures appreciably in excess of 80° C. a distinctly different type of aromatic coffee principle is brought over. This is not only evidenced by differences in taste and aroma which are perceptible when such materials are added to cup coffee but, also, the higher boiling materials are for the most part immiscible with water, whereas the materials brought over below 80° C. are essentially miscible.

It is also desirable in order to distill over the aromatic coffee principles in substantially unaltered form that the duration of the heat treatment be minimized. Of course, no very definite restrictions as to time can be laid down without a thorough consideration of all of the other factors that are involved in a given operation. Such other factors include the moisture content and degree of subdivision of the roasted coffee, the amount of coffee being treated and the heat input with respect thereto, the size and the design of the apparatus, and the like. It has been found that when treating amounts of roasted coffee of the order of 1–3 lbs. using laboratory apparatus the optimum time is about 30 minutes. On the other hand, when treating amounts of the order of 15 lbs. of roasted coffee in pilot plant size equipment a somewhat longer period of about 45–60 minutes is required. In carrying out large scale operations as much as two to three hours may be required because of apparatus design and size and a resultant inability to introduce heat at a sufficiently high rate.

After the condensate has been obtained, unless it has been condensed onto a chilled mass of coffee powder, there remains the problem of handling and incorporating the same into the coffee powder, which must usually be done at temperatures of the order of room temperature or slightly lower. It has been found that this may be done quite successfully and without any appreciable loss of aromatic principles by simply taking the loose solid condensate which is obtained from the condensers and incorporating it into the appropriate amount of coffee powder by tumbling or by any other suitable method of admixing. While this method is an extremely convenient and effective way of incorporating the aromatic principles without suffering a loss thereof, it is also possible to remove the condensate from the condensers and allow the same to warm up to a temperature of the order of room temperature. In the course of doing this the carbon dioxide is removed and could quite possibly carry with it many of the valuable and more fugitive aromatic principles. However, this can be counteracted to a considerable extent by passing the evolved carbon dioxide through a chamber in which there is tumbled coffee powder, the coffee powder being very effective in absorbing the coffee principles from the carbon dioxide. Thereafter when the condensate is entirely in liquid form, and consists for the most part of water and dissolved and/or suspended coffee principles, it may be sprayed onto an appropriate amount of coffee powder as the latter undergoes stirring, tumbling, or other agitation.

The following detailed description illustrates one method that may be used in carrying out the process of the present invention: A 300 gal. steam-jacketed autoclave of the usual type equipped with a hatch that is secured by bolts was employed for the dry distillation. Three outlets were provided in said hatch, one for the introduction of a thermocouple, the second for connecting a manometer or other suitable pressure measuring means and the third for the attachment of steel piping which led to the condensers. The condensers which were connected to the autoclave by the aforementioned steel piping comprised two cylinders about 3 ft. high and 8 in. in diameter. Inserted in the top of each was a 2½ ft. long section of 4 in. diameter pipe to provide a "cold finger." Both the outer and inner sections of pipe were closed off at the end with the exception of the upper end of the aforementioned "cold finger." This was left open so that liquid air or liquid nitrogen could be deposited in the inner section of pipe to effect cooling. The distillate from the autoclave was introduced into the condenser through an inlet at the top of the outer section of pipe and the pump or evacuating apparatus was connected to the system through an outlet about 6 in. from the bottom of the outer section of pipe and on the opposite side from the inlet. The two condensers were employed in series in carrying out the run herein described but they may also be employed in parallel, if desired.

About 200 lbs. of medium-roast, regular grind, coffee containing about 2% moisture were placed in the aforementioned 300 gal. autoclave through the hatch provided therein. The hatch was closed and securely bolted, the aforementioned cold fingers in the condensers were filled with liquid nitrogen and the oil pump was started to evacuate the system. After the pressure had been reduced to about 30 mm., atmospheric steam was introduced into the steam jacket surrounding the autoclave. After about 15 minutes the temperature of the coffee had been raised to about 50° C. and the pressure in the system had been reduced to about 13 mm. The heating and evacuation were continued for an additional 45 minutes during which the temperature of the coffee rose to about 70° C.

At the end of this time the pump was disconnected from the system by closing a stopcock between the condensers and said pump and detaching the pump from the stopcock. Thereafter the pressure of the system was allowed to gradually rise to that of the atmosphere. The condensers were then taken apart and the condensate which was in the form of a loose solid was scraped from the cold fingers of said condensers. Of course, the great bulk of the condensate was contained in the first condenser. The solid condensate was allowed to stand at about room temperature for one hour after which it had melted to a light amber colored liquid amounting to about 436 g. The condensate was then incorporated into about 52 lbs. of dry soluble coffee powder, obtained previously from about 200 lbs. of ground roasted coffee, by tumbling the powder in a revolving drum and slowly spraying the condensate through a high pressure nozzle onto the coffee powder. After the entire quantity of distillate had been so incorporated into the coffee powder, the whole was allowed to stand overnight for tempering, was screened to remove and permit the breaking up of lumps and was then packed in air-tight jars. Since the moisture content of the powder into which the condensate of aromatic coffee principles was incorporated was about 2%, the incorporation of said principles did not increase the moisture content above the 4.5% level at which there is danger of the product caking on storage or during its shelf life.

Although the present invention has been described with particular reference to specific embodiments, the same are not to be construed as in any way limiting the invention. Reference is therefore to be had solely to the appended claims for the purpose of determining the scope of said invention.

What is claimed is:

1. A process of obtaining an aromatic fraction from roasted coffee which comprises subjecting such coffee to a temperature within the range of about 25°–80° C. at an absolute pressure of less than 20 mm. to cause the removal of said fraction therefrom and condensing said fraction.

2. A process of obtaining an aromatic fraction from ground roasted coffee which comprises subjecting such coffee to a temperature within the range of about 25°–80° C. at an absolute pressure of less than 20 mm. and for a period of less than three hours to cause the removal of said fraction therefrom and condensing said fraction.

3. A process of obtaining an aromatic fraction from ground roasted coffee which comprises subjecting such coffee to a temperature within the range of about 50°–70° C. at an absolute pressure of less than 20 mm. and for a period of less than three hours to cause the removal of said fraction therefrom and condensing at least the most volatile constituents of said fraction at a temperature of about −180° C.

4. A process of obtaining an aromatic fraction from finely ground roasted coffee which comprises subjecting such coffee to a temperature of within the range of about 50°–70° C. at an absolute pressure of less than 20 mm. and for a period of about one hour to cause the removal of said fraction therefrom and condensing the moisture content of said distillate at a temperatre within the range of about 0° to −30° C. and the more volatile constituents thereof at about −180° C.

5. A process of obtaining an aromatic fraction from roasted coffee which comprises subjecting such coffee containing less than about 2% moisture to a temperature within the range of about 25°–80° C. at an absolute pressure of less than 20 mm. to cause the removal of said fraction therefrom and condensing said fraction.

6. A process of obtaining an aromatic fraction from ground roasted coffee which comprises subjecting such coffee containing less than about 2% moisture to a temperature within the range of about 50°–70° C. at an absolute pressure of less than 20 mm. and for a period of less than three hours to cause the removal of said fraction therefrom and condensing at least the most volatile constituents of said fraction at a temperature of about −180° C.

7. A process of preparing an aromatized soluble coffee which comprises subjecting ground roasted coffee to a temperature within the range of about 25°–80° C. at an absolute pressure of less than 20 mm. to cause the removal therefrom of an aromatic fraction and condensing and incorporating the same into a soluble coffee product.

8. A process of preparing an aromatized soluble coffee product which comprises subjecting ground roasted coffee to a temperature within the range of about 50°–70° C. at an absolute pressure of less than 20 mm. and for a period of less than three hours to cause the removal therefrom of an aromatic fraction condensing at least the most volatile constituents of said fraction at a temperature of about −180° C. and incorporating the same into a soluble coffee product.

9. A process of preparing an aromatized soluble coffee powder which comprises subjecting ground roasted coffee containing less than about 2% moisture to a temperature within the range of about 25°–80° C. at an absolute pressure of less than 20 mm. to cause the removal therefrom of an aromatic fraction and condensing and incorporating the same into a soluble coffee powder.

10. A process of preparing an aromatized soluble coffee powder which comprises subjecting ground roasted coffee containing less than about 2% moisture to a temperature within the range of about 50°–70° C. at an absolute pressure of less than 20 mm. and for a period of less than three hours to cause the removal therefrom of an aromatic fraction condensing at least the most volatile constituents of said fraction at a temperature of about −180° C. and incorporating the same into a soluble coffee powder.

11. A process of preparing an aromatized cereal beverage product which comprises subjecting ground roasted coffee to a temperature within the range of about 25°–80° C. at an absolute pressure of less than 20 mm. to cause the removal therefrom of an aromatic fraction and condensing and incorporating the same into a cereal beverage product.

12. A process of preparing an aromatized soluble cereal beverage powder which comprises subjecting ground roasted coffee to a temperature within the range of about 50°–70° C. at an absolute pressure of less than 20 mm. and for a period of less than three hours to cause the removal therefrom of an aromatic fraction condensing at least the most volatile constituents of said fraction at a temperature of about −180° C. and incorporating the same into a soluble cereal beverage powder.

13. A process of preparing aromatized soluble coffee powder which comprises subjecting ground roasted coffee to a temperature within the range of 25–80° C. at an absolute pressure of less than 20 mm. to distill off an aromatic fraction, condensing the distillate, and then incorporating the condensate in a soluble coffee powder containing about 2% moisture, the amount of condensate incorporated in said powder being limited so that the moisture content of the aromatized powder does not exceed about 4.5%.

14. A process of preparing aromatized soluble coffee powder which comprises subjecting ground roasted coffee to a temperature within the range of about 50–70° C. at an absolute pressure of less than 20 mm. and for a period of less than three hours to distill off an aromatic fraction, condensing the distillate, the most volatile constituents at least being condensed at a temperature of about −180° C., and then incorporating the condensate in a soluble coffee powder containing about 2% moisture, the combined moisture content of said powder and of the condensate incorporated therein not exceeding 4.5% of the aromatized powder.

References Cited in the file of this patent

UNITED STATES PATENTS

| Number | Name | Date |
|---|---|---|
| 439,318 | Barotte | Oct. 28, 1890 |
| 1,251,359 | Etaix | Dec. 25, 1917 |

FOREIGN PATENTS

| Number | Country | Date |
|---|---|---|
| 246,454 | Great Britain | 1926 |
| 289 | Australia | 1926 |

OTHER REFERENCES

"The Volatile Constituents of Coffee," by Johnston et al., Jour. of Am. Chem. Soc., vol. 60, pp. 1624–1627.